(12) United States Patent
Ning

(10) Patent No.: US 9,329,321 B2
(45) Date of Patent: May 3, 2016

(54) BACKLIGHT MODULE

(71) Applicant: Shenzhen China Star Optoelectronics Technology Co., Ltd., Shenzhen, Guangdong (CN)

(72) Inventor: Chao Ning, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 4 days.

(21) Appl. No.: 14/001,877

(22) PCT Filed: Jun. 28, 2013

(86) PCT No.: PCT/CN2013/078316
§ 371 (c)(1),
(2) Date: Aug. 28, 2013

(87) PCT Pub. No.: WO2014/169531
PCT Pub. Date: Oct. 23, 2014

(65) Prior Publication Data
US 2014/0314376 A1    Oct. 23, 2014

(30) Foreign Application Priority Data
Apr. 19, 2013 (CN) .......................... 2013 1 0138171

(51) Int. Cl.
G02B 6/30 (2006.01)
G02B 6/42 (2006.01)
F21V 8/00 (2006.01)
G02B 6/26 (2006.01)
G02F 1/1335 (2006.01)

(52) U.S. Cl.
CPC .............. G02B 6/0028 (2013.01); G02B 6/005 (2013.01); *G02B 6/0031* (2013.01); *G02B 6/0066* (2013.01); *G02B 6/26* (2013.01); *G02F 2001/133618* (2013.01)

(58) Field of Classification Search
CPC ........ G02B 6/30; G02B 6/423; G02B 6/4204; G02B 6/4292; G02B 6/42; G02B 6/29368; G02B 6/3624; G02B 6/421; G02B 6/3608; G02B 2006/12147; G02B 6/00; G02B 6/0006; G02B 6/274; G02B 6/29317; G02B 6/02
USPC ................................ 385/49, 88–91, 900, 901
See application file for complete search history.

(56) References Cited

U.S. PATENT DOCUMENTS

| | | | | |
|---|---|---|---|---|
| 4,389,085 A | * | 6/1983 | Mori | ............................. 359/591 |
| 6,947,645 B2 | * | 9/2005 | Korenaga | ................. G02B 6/42 385/47 |
| 2001/0012429 A1 | * | 8/2001 | Wach | ................. A61B 5/14546 385/115 |
| 2009/0322985 A1 | * | 12/2009 | Mizuuchi | ........................ 349/62 |

FOREIGN PATENT DOCUMENTS

GB    1541495 A  *  3/1979

* cited by examiner

*Primary Examiner* — Kaveh C Kianni
*Assistant Examiner* — Hung Lam

(57) ABSTRACT

The present invention disclosed a backlight module comprising a light collection system, a light guide plate and a plurality of optical fibers, wherein all light incident ends of the plurality of optical fibers are connected to the light collection system for receiving sunlight; the backlight module further includes an optical fiber connector; the plurality of optical fibers are arranged in parallel on the surface of the light guide plate, with all their light emitting ends flush with the light incident end of the light guide plate; the optical fiber connector abuts against the light emitting end of the plurality of optical fibers and the light incident end of the light guide plate, respectively, used for guiding the sunlight emitting from the light emitting end of the plurality of optical fibers to enter the light guide plate from the light incident end of the light guide plate.

3 Claims, 2 Drawing Sheets

BACKLIGHT MODULE

FIELD OF THE INVENTION

The present invention relates to a backlight module, particularly to an optical-fiber type backlight module using sunlight as the backlight source.

BACKGROUND OF THE INVENTION

The backlight source of an existing TFT-LCD display system, such as the common light-emitting diode or fluorescent tube, mostly uses power source devices such as city power or batteries as a drive unit, having high power consumption and not conducive to energy saving and environmental protection.

In order to reduce energy consumption of the backlight source, there emerges on the market now a backlight module that can use sunlight as the energy source, which collects the sunlight including the visible band desired by the backlight source by using a light collection system and uses the fiber imported backlight module as the backlight source. However, during transportation of such a backlight module, in order to ensure that the optical fiber will not be damaged in the long-distance transportation, a thick film is usually packed at the outside of an optical cable composed of a plurality of bare optical fibers. While installing such a backlight module, in order to import a plurality of optical fibers into the backplane, the bare optical fibers in the optical cable need to be detached from the film and separated one by one, so as to attach to the light guide plate dispersedly, which greatly increases the amount of labor of transportation and assembly. Besides that, because the bare optical fiber used for transferring sunlight is made of quartz material that has poor flexibility, an extended backplane is usually needed, so as to carry and protect the bare optical fiber. However, this will greatly increase the length of the backplane, not only increasing weight of the backplane but also affecting the appearance; besides that, because of increase of area of the backplane, the ratio of the area of the display region of the liquid crystal display to the area of the panel may become less.

SUMMARY OF THE INVENTION

The technical problem to be solved by the present invention is to provide a solar backlight module that is more convenient in transportation and assembly, simpler in structure, and conducive to miniaturization, so as to overcome the above defects of the solar backlight module in the prior art.

The present invention adopts the following technical solution to solve its technical problem: a backlight module, comprising a light collection system, a light guide plate and a plurality of optical fibers, all light incident ends of the plurality of optical fibers are connected to the light collection system for receiving sunlight; the backlight module further includes an optical fiber connector; the plurality of optical fibers are arranged in parallel on a surface of the light guide plate, with all their light emitting ends flush with a light incident end of the light guide plate; the optical fiber connector abuts against the light emitting end of the plurality of optical fibers and the light incident end of the light guide plate, respectively, used for guiding the sunlight emitting from the light emitting end of the plurality of optical fibers to enter the light guide plate from the light incident end of the light guide plate.

Preferably, the optical fiber connector is an isosceles right triangle, whose right angle is opposite to a mirror that abuts against the light emitting end of the plurality of optical fibers and the light incident end of the light guide plate.

Preferably, a light emitting direction of the light emitting end of the plurality of optical fibers is perpendicular to the mirror to which the right angle of the isosceles right triangle prism is opposite.

Preferably, the optical fiber connector is a half-cylindrical lens, whose flat mirror abuts against the light emitting end of the plurality of optical fibers and the light incident end of the light guide plate.

Preferably, the light emitting direction of the light emitting end of the plurality of optical fibers is perpendicular to the flat mirror of the half-cylindrical lens.

Preferably, the material of the optical fiber connector is selected from at least one of the group consisting of glass, polymethyl methacrylate or engineering plastics, and the refractive index of the optical fiber connector is in the range of 1.4-1.6.

Preferably, the optical fiber connector includes two plane mirrors perpendicular to each other, one of the two plane mirrors abutting at its mirror face against the light emitting end of the plurality of optical fibers, the other mirror abutting at its mirror face against the light incident end of the light guide plate.

Preferably, the light emitting direction of the light emitting end of the plurality of optical fibers forms an angle of 45° with the plane mirror.

Preferably, the backlight module further includes an optical film, which is laminated on the other surface of the light guide plate opposite to the surface of the light guide plate on which the plurality of the optical fibers are arranged, so as to adjust brightness and visual angle of the backlight module.

Preferably, the plurality of optical fibers are bonded to each other.

With the backlight module of the present invention, the optical fiber can be arranged on the back of the light guide plate by increasing the number of the optical fiber connector, and the sunlight in the optical fiber can be directly imported into the light guide plate through the optical fiber connector, with the bare optical fibers in the optical fiber not necessary to be separated, thus neither the length of the backplane needing to be increased nor the ratio of the area of the display region being reduced. Meanwhile, the backlight module is allowed to be more convenient in transportation and assembly, simpler in structure, and more esthetic in appearance.

BRIEF DESCRIPTIONS OF THE DRAWINGS

The present invention will further be explained below with reference to drawings and examples. In the drawings.

DETAILED DESCRIPTION OF THE EMBODIMENTS

The backlight module of the present invention is directed to an improvement in the optical-fiber type backlight module using sunlight as the backlight source, and includes a light collection system, a light guide plate, an optical fiber connector, and a plurality of optical fibers, wherein the light collection system is used for converging sunlight into the optical fiber, the plurality of optical fibers are arranged horizontally in parallel below the light guide plate, and the optical fiber connector changes the transfer direction of the sunlight from the plurality of optical fibers by 180 degrees before importing it into the light guide plate. Thus, a backlight module with a narrow frame using sunlight as the light source can be obtained while saving energy; when the sunlight in the optical fiber is transferred to the light guide plate, all the bare optical fibers packed together are not necessary to be separated one by one before being connected to the light guide plate, and then the backplane carrying the light guide plate is not necessary to be extended for carrying and protecting the bare optical fiber. Further, using the backlight module of the present invention can reduce frame thickness and backplane length of the backlight module, reduce weight and cost of the backlight module, improve appearance of the backlight module, and reduce the transmission loss.

In the preferred example of the present invention, a plurality of optical fibers can first be bonded together, and then fixed below the light guide plate, thus facilitating not only transportation but also assembly of the backlight module.

Figure 1:
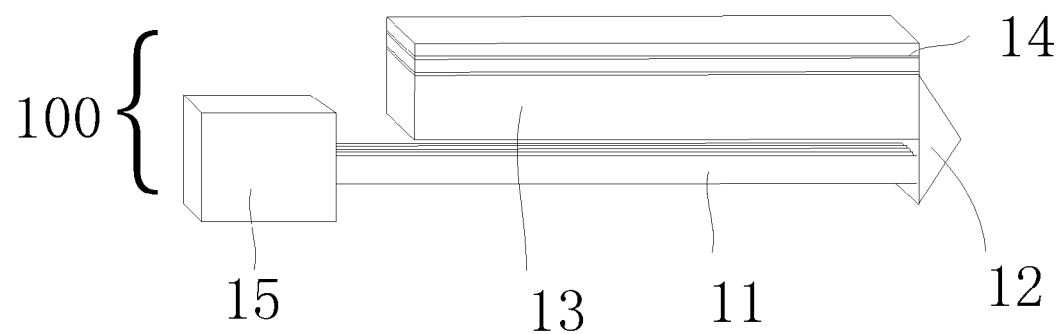
FIG. 1 is a structural schematic diagram of the backlight module provided by example 1 of the present invention.
Figure 2:
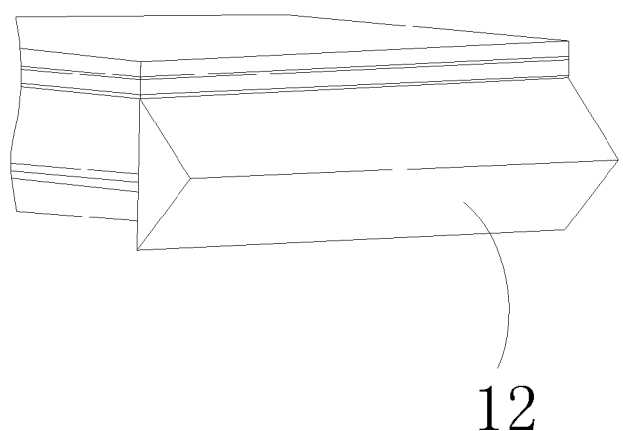
FIG. 2 is a structural schematic diagram of the backlight module as shown in FIG. 1 in another direction.

FIGS. 1 and 2 show the backlight module 100 of the first embodiment of the present invention. As shown in the figures, the backlight module 100 of the present invention includes a light collection system 15 used for collecting sunlight, a light guide plate 13, an optical fiber connector 12, and a plurality of optical fibers 11. Wherein the plurality of optical fibers 11 are parallel to each other and coplanar and fixed side by side to the back of the light guide plate 13 (the lower surface of the light guide plate 13 as shown in the figures), and the light emitting end of each optical fiber 11 is parallel to and coplanar (flush) with the light incident end of the light guide plate 13 (the right end face of the light guide plate 13 as shown in the figures). The optical fiber connector 12 in this embodiment is an isosceles right triangle prism 12, whose right angle is opposite to a mirror having an upper portion abutting against the light incident end of the light guide plate 13 and a lower portion abutting against the light emitting end of the optical fiber 11, used for transferring the sunlight emitted from the light emitting end of the optical fiber 11 to the light guide plate 13 through the light incident end of the light guide plate 13.

In this embodiment, the light guide plate 13 is made of an acrylic sheet, on the undersurface of which are printed light guide spots by the UV screen printing technology. The materials used for printing have a very high reflectivity and zero absorbance. This acrylic sheet is used for absorbing the light emitting from the light source, making the light stop over on the surface of the acrylic sheet; when the light irradiates each of the light guide spots, the reflected light will be diffused to different directions, and undermine the reflection conditions before being emitted from the front of the light guide plate. Through a variety of light guide spots of different density and size, the light guide plate 13 can be made to emit light evenly. In addition, for further improving the visual angle and uniformity of brightness of the backlight module 100, at least one optical film 14 can be fitted on the light emitting surface of the light guide plate 13 (the upper surface of the light guide plate 13 in the figures), with the optical film 14 laminated on the upper surface of the light guide plate 13.

In this embodiment, the isosceles right triangle prism 12 is made of glass, polymethyl methacrylate or engineering plastics having a high refractive index, and has a refractive index in the range of 1.4-1.6, enabling sunlight to be transferred efficiently to the light guide plate 13 based on the reflection principle; the isosceles right triangle prism 12 has an edge length greater than or equal to the width of the light guide plate 13, so as to prevent leakage of light.

In the specific implementation process, the light collection system 15 converges and guides sunlight into the plurality of optical fibers 11, which project the sunlight transferred by them approximately perpendicularly onto the right angle mirror of the isosceles right triangle prism 12 (the mirror opposite to the right angle); the isosceles right triangle prism 12 then reflects the incident sunlight twice before transferring it approximately perpendicularly to the light incident end of the light guide plate 13 that, by making use of the high light transmission rate of the light guide spots, makes the light source refracted into a surface light source that is to be presented to a customer, and then the optical film 14 is used for making the brightness of the backlight module 100 more uniform and the visual angle thereof more appropriate.

Figure 3:
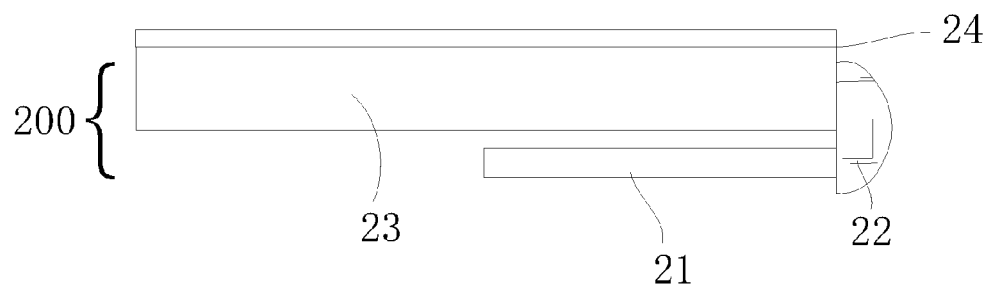
FIG. 3 is a structural schematic diagram of the backlight module provided by example 2 of the present invention.

FIG. 3 shows the backlight module 200 of the second embodiment of the present invention. As shown in the figure, the backlight module 200 of the present invention includes a light collection system 25, a light guide plate 23, an optical fiber connector 22, and a plurality of optical fibers 21. Wherein the light collection system 25, the light guide plate 23 and the plurality of optical fibers 21 are completely the same with the light collection system 15, the light guide plate 13 and the plurality of optical fibers 11 of the backlight module 100 of the above first embodiment in features and assembly methods theirselves. The optical fiber connector 22 in this embodiment is a half-cylindrical lens 22, whose flat mirror has an upper portion abutting against the light incident end of the light guide plate 23 and a lower portion abutting against the light emitting end of the optical fiber 21, used for transferring the sunlight emitted from the light emitting end of the optical fiber 21 to the light guide plate 23 through the light incident end of the light guide plate 23, so as to prevent leakage of light.

In this embodiment, the specific structure of the light guide plate 23 is the same with the light guide plate 13 of the first embodiment; in addition, for further improving the visual angle and uniformity of brightness of the backlight module 200, the light guide plate 23 can be provided on its light emitting surface (the upper surface) with at least one optical film 24 identical to the optical film 14 of the above first embodiment, with the optical film 24 laminated on the upper surface of the light guide plate 23.

In this embodiment, the half-cylindrical lens 22 is made of glass, polymethyl methacrylate or engineering plastics having a high refractive index, and has a refractive index in the range of 1.4-1.6, enabling sunlight to be transferred efficiently to the light guide plate 23 based on the reflection principle; the specific light path of light in the half-cylindrical lens 22 is as shown in FIG. 3, with the length of the half-cylindrical lens 22 greater than or equal to the width of the light guide plate 23, so as to prevent leakage of light.

In the specific implementation process, the light collection system 25 converges sunlight into the plurality of optical fibers 21, which project the sunlight transferred by them approximately perpendicularly onto the flat mirror of the half-cylindrical lens 22, which then reflects the incident sunlight twice before transferring it approximately perpendicularly to the light incident end of the light guide plate 23 that, by making use of the high light transmission rate of the light guide spots, makes the light refracted into a surface light source that is to be presented to a customer, and then the optical film 24 is used for making the brightness of the backlight module 200 more uniform and the visual angle thereof more appropriate.

Figure 4:
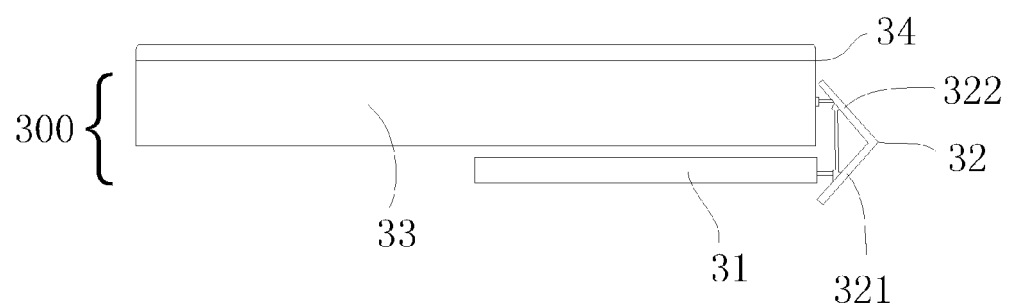
FIG. 4 is a structural schematic diagram of the backlight module provided by example 3 of the present invention.

FIG. 4 shows the backlight module 300 of the third embodiment of the present invention. As shown in the figure, the backlight module 300 of the present invention includes a light collection system 35, a light guide plate 33, an optical fiber connector 32, and a plurality of optical fibers 31. Wherein the light collection system 35, the light guide plate 33 and the plurality of optical fibers 31 are completely the same with the light collection system 15, the light guide plate 13 and the plurality of optical fibers 11 of the backlight module 100 of the above first embodiment in features and assembly methods theirselves. The optical fiber connector 32 in this embodiment is a mirror group 32, which includes a plane mirror 321 and a plane mirror 322 forming an angle of 90 degrees therebetween (perpendicular to each other), the plane mirror 321 abutting against the light emitting end of the optical fiber 31, the plane mirror 322 abutting against the light incident end of the light guide plate 33, with the direction of the received sunlight changed by 180 degrees after two reflections, used for reversely transferring the sunlight emitted from the light emitting end of the optical fiber 31 to the light guide plate 33 through the light incident end of the light guide plate 33.

In this embodiment, the specific structure of the light guide plate 33 is the same with the light guide plate 13 of the first embodiment; in addition, for further improving uniformity of the visual angle and brightness of the backlight module 300, the light guide plate 33 can be provided on its light emitting surface (the upper surface) with at least one optical film 34 identical to the optical film 14 of the above first embodiment, with the optical film 34 laminated on the upper surface of the light guide plate 33.

In this embodiment, the plane mirrors 321 and 322 included in the mirror group 32 are hollow mirrors, and can totally reflect the light transferred to the mirror, with the length of the mirror group 32 greater than or equal to the width of the light guide plate 33, so as to prevent leakage of light.

In the specific implementation process, the light collection system 35 converges sunlight into the plurality of optical fibers 31, which project the sunlight transferred by them onto the plane mirror 321 at an angle of 45 degrees; then the plane mirror 321 reflects the light at an angle of 45 degrees onto the plane mirror 322, which reflects the light at an angle of 45 degrees onto the light incident end of the light guide plate 33, with the light reflected onto the light incident end of the light guide plate 33 approximately perpendicular to the end surface of this light incident end; the light guide plate 33, by making use of the high light transmission rate of the light guide spots, makes the light source refracted into a surface light source that is to be presented to a customer, and then the optical film 34 is used for making the brightness of the backlight module 300 more uniform and the visual angle thereof more appropriate.

All the above are only the preferred examples of the present invention, and do not limit the present invention. For those skilled in the art, the present invention can have a variety of amendment and change. Any amendment, equivalent replacement, improvement, etc. within the spirit and principle of the present invention shall fall within the protection scope of claims of the present invention.

What is claimed is:

1. A backlight module, comprising
a light collection system,
a light guide plate,
a plurality of optical fibers, and
an optical fiber connector;
wherein, the optical fiber connector is configured to be hollow and includes two plane mirrors perpendicular to each other;
the plurality of optical fibers are arranged in parallel on a surface of the light guide plate; one ends of the plurality of optical fibers are connected to the light collection system for receiving sunlight, the other ends of the plurality of optical fibers flush with a light incident end of the light guide plate are physically abutted against one of the two plane mirrors, and the other one of the two plane mirrors is abutted against the light incident end of the light guide plate; the optical fiber connector is used for guiding the sunlight emitting from one ends of the plurality of optical fibers to enter the light guide plate from the light incident end of the light guide plate;
the length of the optical fiber connector is greater than or equal to the width of the light guide plate;
the refractive index of each of the two plane mirrors is in the range of 1.4-1.6; and
the light is emitted to one plane mirror directly via the plurality of optical fibers in an identical angle of 45° to the plane mirror and the two plane mirrors totally reflect the light received.

2. The backlight module according to claim 1, wherein material of the optical fiber connector is selected from at least one of the group consisting of glass, polymethyl methacrylate or engineering plastics.

3. The backlight module according to claim 1, wherein the backlight module further includes an optical film, which is laminated on the other surface of the light guide plate opposite to the surface of the light guide plate on which the plurality of the optical fibers are arranged, so as to adjust brightness and visual angle of the backlight module.

* * * * *